United States Patent [19]

Mori et al.

[11] 4,349,854
[45] Sep. 14, 1982

[54] POWER GENERATION CONTROL SYSTEM FOR VEHICLE GENERATOR

[75] Inventors: Kazumasa Mori, Aichi; Taro Asahi, Chiryu; Keiichiro Banzai, Toyota; Katsutaro Iwaki, Chiryu; Katsuya Muto, Kariya; Akira Mase, Handa; Takayasu Nimura, Nagoya; Katsumi Itoh, Ohbu; Yoshio Akita, Ichinomiya, all of Japan

[73] Assignee: Nippondenso Co., Ltd., Kariya, Japan

[21] Appl. No.: 151,156

[22] Filed: May 19, 1980

[30] Foreign Application Priority Data

May 25, 1979 [JP] Japan ................................ 54-65325

[51] Int. Cl.$^3$ .............................................. H02J 7/24
[52] U.S. Cl. .................................. 361/21; 322/28; 361/91
[58] Field of Search ................ 361/20, 21, 91; 322/28

[56] References Cited

U.S. PATENT DOCUMENTS

| 3,835,367 | 9/1974 | Wiley | 322/28 |
| 3,938,005 | 2/1976 | Cummins | 322/28 X |
| 3,959,708 | 5/1976 | Allport et al. | 322/28 X |
| 4,023,089 | 5/1977 | Arakane | 322/28 |

Primary Examiner—Harry E. Moose, Jr.
Attorney, Agent, or Firm—Cushman, Darby & Cushman

[57] ABSTRACT

A power generation control system for a vehicle generator comprises a generator including an armature coil, an exciting coil and a rectifier for rectifying the AC output of the armature coil, a battery, and a voltage control device for controlling the activation of the generator in accordance with the terminal voltage of the battery. This power generation control system further comprises an abnormal voltage detector circuit for detecting the voltage generated across the armature coil and cutting off the current flowing in the exciting coil when said voltage exceeds a predetermined value. The abnormal voltage detector circuit has the function to hold this forcible stoppage of power generation.

5 Claims, 4 Drawing Figures

POWER GENERATION CONTROL SYSTEM FOR VEHICLE GENERATOR

The present invention relates to a power generation control system for a vehicle power generator, or more in particular to a power generation control system for regulating the high voltage generated at the time of breakage or cut off of the output line of a generator.

Generally, in a power generation control system of this type, a detection voltage is detected only from a battery terminal and no voltage is detected from the output terminal of the generator as an abnormal detection voltage. Even in a voltage regulation system in which the detection voltage is detected from both the generator output terminal and the battery terminal, no alarm is provided when the output terminal is opened.

In the case where a voltage detection terminal for voltage control is that of a battery without detecting the generator output terminal voltage as shown in the prior art, the battery terminal voltage drops when the output line of the generator is cut off. On the other hand, the voltage of the output terminal of the generator increases so high that an electric load of small current consumption (light electric load), if any, connected to the output terminal may be damaged or burnt by this high voltage. Also, the terminals may be burnt by a spark or the like generated owing to insufficient connection of a terminal connector. In the case where the detection terminal for voltage regulation is the generator output terminal, although the voltage is regulated when the output terminal comes off, no alarm is given to the driver, so that the vehicle will continue to run without the battery being charged, thus leading to the engine stall on the road owing to the discharge of the battery.

The present invention has been developed in view of the above-mentioned facts and the object of the invention is to provide a power generation control system for a vehicle generator in which a voltage detection terminal for voltage regulation is the battery terminal, and the generator output voltage is detected from the generator output terminal, so that when the generator output line is cut off, the abnormal voltage appearing at the generator output terminal is detected thereby to stop power generation, thus protecting an electric load from being damaged by the abnormal voltage generated at the generator output terminal.

These and other objects, features and advantages of this invention will be apparent from the following description taken in conjunction with the accompanying drawings, in which.

Figure 1:
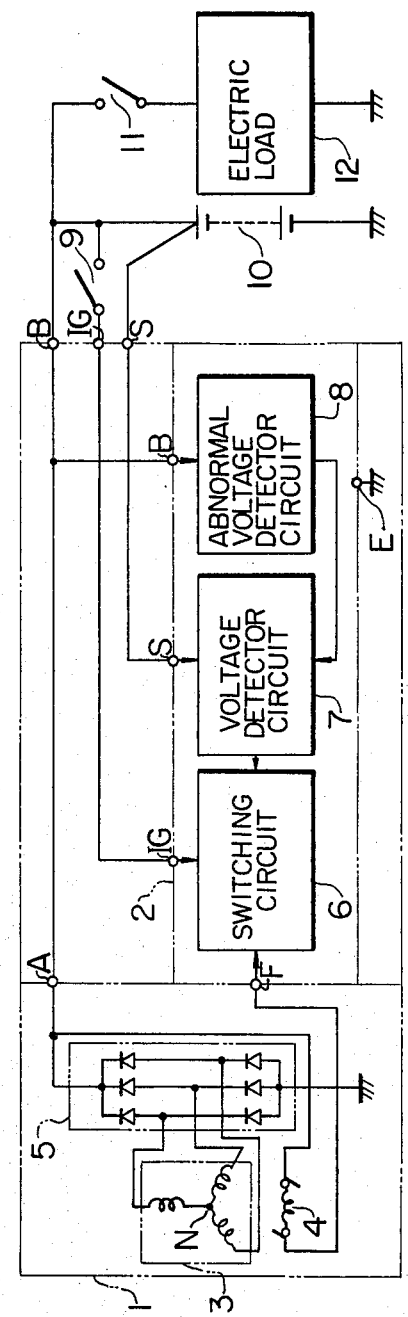
FIG. 1 is a diagram generally showing a circuit according to an embodiment of the system of the present invention.

An embodiment of a vehicle power generator according to the invention is schematically shown in FIG. 1. Reference numeral 1 shows a generator driven by the engine carried in the automotive vehicle. In this case, a DC output voltage is obtained by rectifying a three-phase AC voltage generated by a Y-connection alternator. Numeral 12 shows a block illustrating a power generation control system making up the essential parts of the present invention. In the blocks 1 and 2, numeral 3 shows an armature coil, numeral 4 a coil for exciting the generator, numeral 5 a full-wave rectifier, numeral 6 a switching circuit for regulating the current supply to the exciting coil 4, numeral 7 a voltage detector circuit for detecting the charge voltage at the battery 10, and numeral 8 an abnormal voltage detector circuit having a holding function which detects the output voltage of the armature coil 3 and cuts off the switching circuit 6 at the time of generation of an abnormally high voltage. An electric load 12 for the vehicle or an electric device is connected to the battery 10 through a switch 11.

Figure 2:
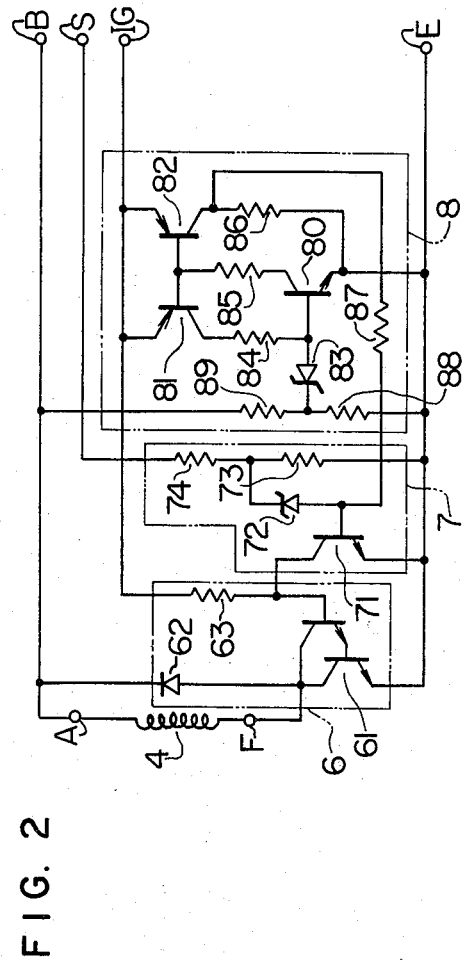
FIG. 2 is an electrical circuit diagram showing a specific example of the generation control system according to the present invention.

Next, a specific embodiment of the power generation control system 2 shown in FIG. 2 will be described. The switching circuit 6 includes a Darlington pair 61 of transistors, a flywheel diode 62 and a resistor 63. The collector of the Darlington pair 61 is connected to the exciting coil 4 and flywheel diode 62 absorbs of reverse electromotive force. The other terminal of the exciting coil 4 is connected to the output terminal A of the armature coil 3. The other end of the flywheel diode 62 is connected to the input terminal B. The input terminal B is of course on the line of the same potential as the output terminal A and is considered equivalent to the connection with the output terminal A. The base of the Darlington pair 62 is connected to the ignition terminal IG of the key switch 9 through a resistor 63. The voltage detector circuit 7 includes resistors 73 and 74 for dividing the voltage of the input terminal S, a constant-voltage diode or Zener diode 72 for conducting or cutting off the divided voltage after discrimination thereof, and a transistor 71. After the engine of the vehicle is ignited with the key switch 9 being switched on, this voltage detector circuit 7 operates to actuate the Darlington pair 61 in the same way as in the prior art and regulates the voltage of the input terminal S, namely, the charge voltage of the battery 10 at a predetermined level.

The abnormal voltage detector circuit 8 is a voltage detection hold circuit made up of transistors 80, 81 and 82, a Zener diode 83 and resistors 84, 85, 86, 87, 88 and 89. The main functions of this circuit are performed by a voltage divider circuit including resistors 88 and 89, and the Zener diode 83. When the B-terminal voltage exceeds a set voltage, the transistor 80 conducts and at the same time the transistor 81 conducts, so that the transistor 80 continues to conduct even when the B-terminal voltage drops. Thus the transistor 82 conducts causing the transistor 71 to conduct, with the result that the Darlington pair 61 is cut off, thus stopping power generation.

Next the operation of the above-mentioned system according to the invention will be described. In FIG. 2, when the key switch 9 is closed, power is supplied to the ignition terminal IG and the engine starts to operate, so that the generator begins to generate power. When the battery charge voltage exceeds a set voltage, the Zener diode 72 conducts, so that the transistor 71 conducts, and the Darlington pair 61 is cut off. Subsequently, according to the battery charge voltage, the Darlington pair 61 conducts or is cut off, with the result that the battery charge voltage is regulated at the desired set voltage.

In the event that the wiring for connecting the generator output terminal to the battery 10 is broken at any part, the battery 10 stops being charged from the generator 1. Therefore, the voltage across the battery drops, the Darlington pair 61 conducts for full excitation, and an abnormally high voltage is generated at the output terminal A of the generator 1. At the same time, the Zener diode 83 conducts and the transistors 80, 81 and 82 conduct, and therefore even when the generator output voltage drops, the transistors 80 and 82 are kept on, so that the transistor 71 conducts and the Darlington pair 61 is cut off, thus keeping the generator off. This generation stoppage signal is maintained until the key switch is turned off.

Figure 3:
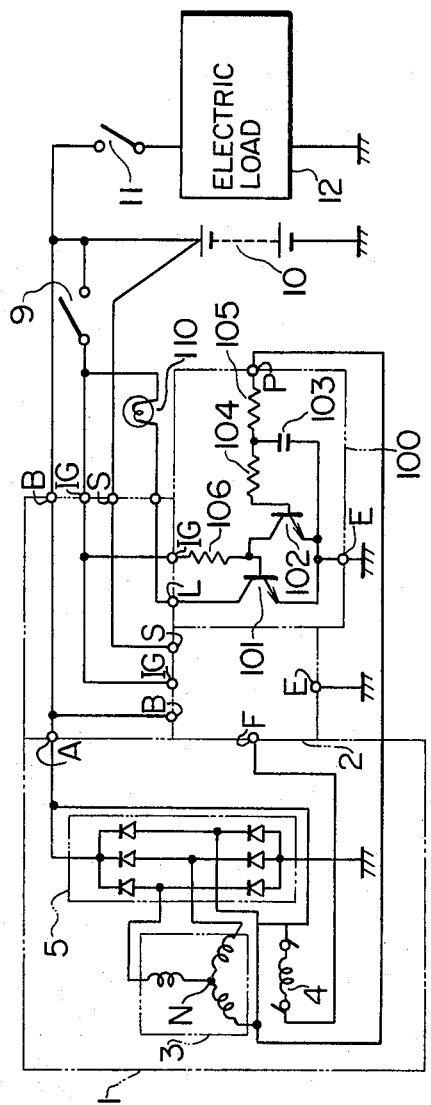
FIGS. 3 and 4 are electrical circuit diagrams showing other embodiments of the present invention.

A certain voltage regulation system includes a charge indication device for indicating power generation, which is detected by determining the single-phase winding voltage from the P terminal (shown in FIG. 3) or a neutral voltage from the N terminal (shown in FIG. 3) of the generator 1. In this type of voltage regulation system, the P terminal voltage is reduced to zero and the charge indication lamp is lit, thus informing the driver of the abnormal condition. Specifically, in FIG. 3, numeral 100 shows the charge indication device, and numeral 110 the power generation indication lamp. In normal power generation, a voltage applied from the P terminal of the generator is smoothed by a smoothing circuit including a resistors 104 and 105 and a capacitor 103, so that the transistor 102 conducts and the transistor 101 is cut off, thus keeping the lamp 110 off. In the absence of the input from the generator, on the other hand, the transistor 102 is cut off and the transistor 101 conducts, so that the lamp 110 is lit, thus informing the driver of the abnormal conduction of power generation.

Figure 4:
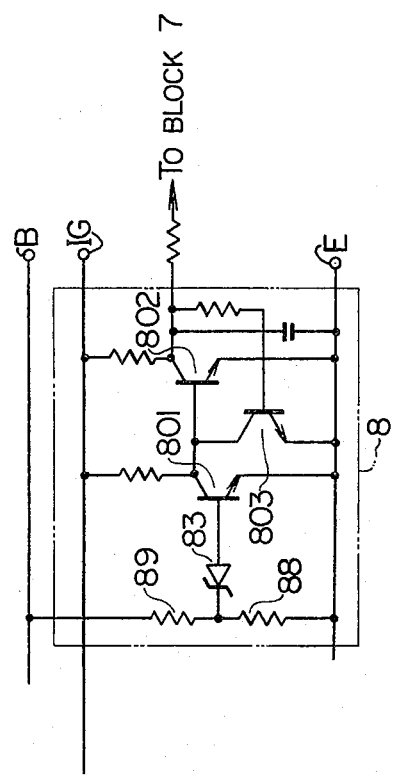

In this embodiment, the abnormal voltage detector circuit 8 is comprised of a combination of transistors. The hold circuit, however, may alternatively be comprised of another switching element such as an SCR. Also, the abnormal voltage detector circuit 8 shown in FIG. 2 may be replaced with equal effect by any of various modifications such as a circuit using transistors 801 to 803 as shown in FIG. 4.

Although the exciting coil 4 derives the power thereof from the generator output terminal in this embodiment, the exciting power may alternatively be drawn from the IG terminal.

Further, according to the present invention, the holding function is performed after occurrence of an abnormal condition. By removing the transistor 81 in FIG. 2, however, it is possible to normalize the power generation after the normal condition is restored.

It will be understood from the foregoing description that according to the present invention power generation is forcibly stopped in the case where any part of the charge output line between the generator and the battery is broken, resulting in the advantages mentioned below.
(1) The load is protected from burning or damage which otherwise might be caused by the high voltage.
(2) An in-traffic trouble which otherwise might be caused by the battery failing to function is prevented.
(3) The rotor coil is prevented from being burnt by the high voltage.

Further, the object of the present invention is achieved only by adding a few elements and therefore the system according to the present invention is suitable for integrated circuitry construction.

What is claimed is:

1. A power generation control system in combination with a vehicle generator including an armature coil, an exciting coil and a rectifier for converting an a.c. voltage produced from the armature coil into a d.c. current, and a vehicle battery charged by said generator, said power generation control system comprising:
   a switching circuit including a single power transistor for controlling a current flowing into the exciting coil of said generator;
   a voltage detector circuit for detecting a voltage of said battery to activate said single power transistor of said switching circuit; and
   an overvoltage detecting means for deactivating said single power transistor of said switching circuit controlled by said voltage detector circuit, which in turn cuts off the current of said exciting coil independently of the operation of said voltage detector circuit when the voltage of said battery exceeds a predetermined value, said overvoltage detecting means including a transistor circuit for holding the deactivation of said switching circuit.

2. A power generation control system according to claim 1 in which said overvoltage detecting transistor circuit comprises:
   a Zener diode having a first terminal for receiving a voltage related to said battery voltage and a second terminal;
   a first transistor having a base electrode connected to said Zener diode second terminal and rendered conductive upon the conduction of said Zener diode;
   a second transistor responsive to said first transistor to hold said first transistor conductive after the time when said Zener diode is changed from a conductive state to a non-conductive state; and
   a third transistor responsive to said first transistor to provide a deactivation signal to said switching circuit.

3. A power generation control system according to claim 1 in which said overvoltage detecting transistor circuit comprises:
   a Zener diode having a first terminal for receiving a voltage related to said battery voltage and a second terminal;
   a first transistor connected to said Zener diode second terminal and rendered conductive upon the conduction of said Zener diode;
   a second transistor responsive to said first transistor to provide a deactivation signal to said switching circuit; and
   a third transistor responsive to said second transistor for holding the operation of said second transistor after the time when said Zener diode is changed from a conductive state to a non-conductive state.

4. A power generation control system according to claim 1, further comprising a charge indication device for lighting a charge indication lamp in response to the absence of output of said armature coil.

5. A power generation control system according to claim 1 in which said single power transistor is of Darlington configuration.

* * * * *